(12) United States Patent
Kyo et al.

(10) Patent No.: US 9,441,787 B2
(45) Date of Patent: Sep. 13, 2016

(54) ROTATABLE APPARATUS

(71) Applicant: EBARA CORPORATION, Tokyo (JP)

(72) Inventors: Seigo Kyo, Tokyo (JP); Yoichi Nakamura, Tokyo (JP); Junya Kawabata, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 0 days.

(21) Appl. No.: 14/625,964

(22) Filed: Feb. 19, 2015

(65) Prior Publication Data

US 2015/0300566 A1    Oct. 22, 2015

(30) Foreign Application Priority Data

Feb. 21, 2014 (JP) .................. 2014-031932

(51) Int. Cl.
| | |
|---|---|
| *F16P 1/04* | (2006.01) |
| *F16P 1/02* | (2006.01) |
| *F04D 13/02* | (2006.01) |
| *F04D 15/02* | (2006.01) |

(52) U.S. Cl.
CPC ................ *F16P 1/02* (2013.01); *F04D 13/02* (2013.01); *F04D 15/02* (2013.01)

(58) Field of Classification Search
CPC ............. F16P 1/02; F16P 1/04; F04D 13/02; F04D 15/02
USPC ........... 464/23, 170; 403/23; 74/609; 417/423.14; 220/213, 241, 242, 305, 220/327, 350, DIG. 21
See application file for complete search history.

(56) References Cited

U.S. PATENT DOCUMENTS

| | | | | |
|---|---|---|---|---|
| 1,670,442 | A | * | 5/1928 | Fetter ................. B65D 45/02 220/327 |
| 4,033,531 | A | * | 7/1977 | Levine ................. F16M 7/00 |
| 2009/0214333 | A1 | | 8/2009 | Hernandez et al. |
| 2012/0257999 | A1 | * | 10/2012 | Hsieh ................. F04D 25/0613 417/423.14 |
| 2015/0093924 | A1 | * | 4/2015 | Villarreal ............. B29C 66/112 |

FOREIGN PATENT DOCUMENTS

| | | |
|---|---|---|
| DE | 10 2011 009214 A1 | 7/2012 |
| EP | 2 096 266 A1 | 9/2009 |
| JP | 58-92495 A | 6/1983 |
| JP | S58-92495 U | 6/1983 |
| JP | 07-247986 A | 9/1995 |
| JP | 2001-055098 A | 2/2001 |

OTHER PUBLICATIONS

Extended European Search Report for Application No. 15155664.4 dated Jul. 17, 2015.

* cited by examiner

*Primary Examiner* — Gregory Binda
(74) *Attorney, Agent, or Firm* — Pearne & Gordon LLP

(57) ABSTRACT

A rotatable apparatus includes a casing and a protector for closing an opening. The casing includes first and second casing faces intersecting at angle θ1. The first casing face is provided with an opening. The protector includes first and second protector faces abutting and intersecting each other at angle θ2. The protector is fixed to only the second casing face. The angle θ2 is larger than the angle θ1 when the protector is removed from the casing. The protector is attached to the casing in such a manner that the second protector face is fixed to the second casing face, and that the first protector face is elastically deformed so that an edge part of the first protector face, which is located on the side opposite to the second protector face, closely contacts the first casing face.

6 Claims, 6 Drawing Sheets

Fig. 5

| ANGLE θ2 (DEGREE) | 93 | 94 | 95 | 96 | ... | 104 | 105 | 106 | 107 |
|---|---|---|---|---|---|---|---|---|---|
| CONTACT CONDITION | × | × | ○ | ○ | ○ | ○ | ○ | ○ | ○ |
| ELASTICITY CONDITION | ○ | ○ | ○ | ○ | ○ | ○ | ○ | × | × |

ROTATABLE APPARATUS

TECHNICAL FIELD

The present invention relates to a technology of closing an opening that is formed in a casing of a rotatable apparatus.

BACKGROUND ART

The casing of a rotatable apparatus is sometimes provided with an opening for maintenance and inspection purposes. Such an opening is normally closed by a detachable protector to protect a human upper limb (hand, for example) from being inserted into the opening and contacting a rotating part. The protector is removed when maintenance and inspection are needed (for example, Japanese Patent Public Disclosure Nos. 58-92495 and H7-247986).

SUMMARY

One embodiment of the invention provides a rotatable apparatus. The rotatable apparatus includes a casing including a first casing face provided with an opening and a second casing face abutting the first casing face, the second casing face intersecting the first casing face at angle θ1; and a protector for closing the opening, the protector including a first protector face and a second protector face abutting the first protector face, the second protector face intersecting the first protector face at angle θ2. The protector is configured to be fixed to only the second casing face. The angle θ2 is larger than the angle θ1 when the protector is removed from the casing. The protector is configured to be attached to the casing in such a manner that the second protector face is fixed to the second casing face, and that the first protector face is elastically deformed so that an edge part of the first protector face, which is located on the side opposite to the second protector face, closely contacts the first casing face.

BRIEF DESCRIPTION OF DRAWINGS

FIG. 5 is a table indicating the results of an evaluation test on an intersection angle of two faces of the protector;

DESCRIPTION OF EMBODIMENTS

A. Embodiments

Figure 1:
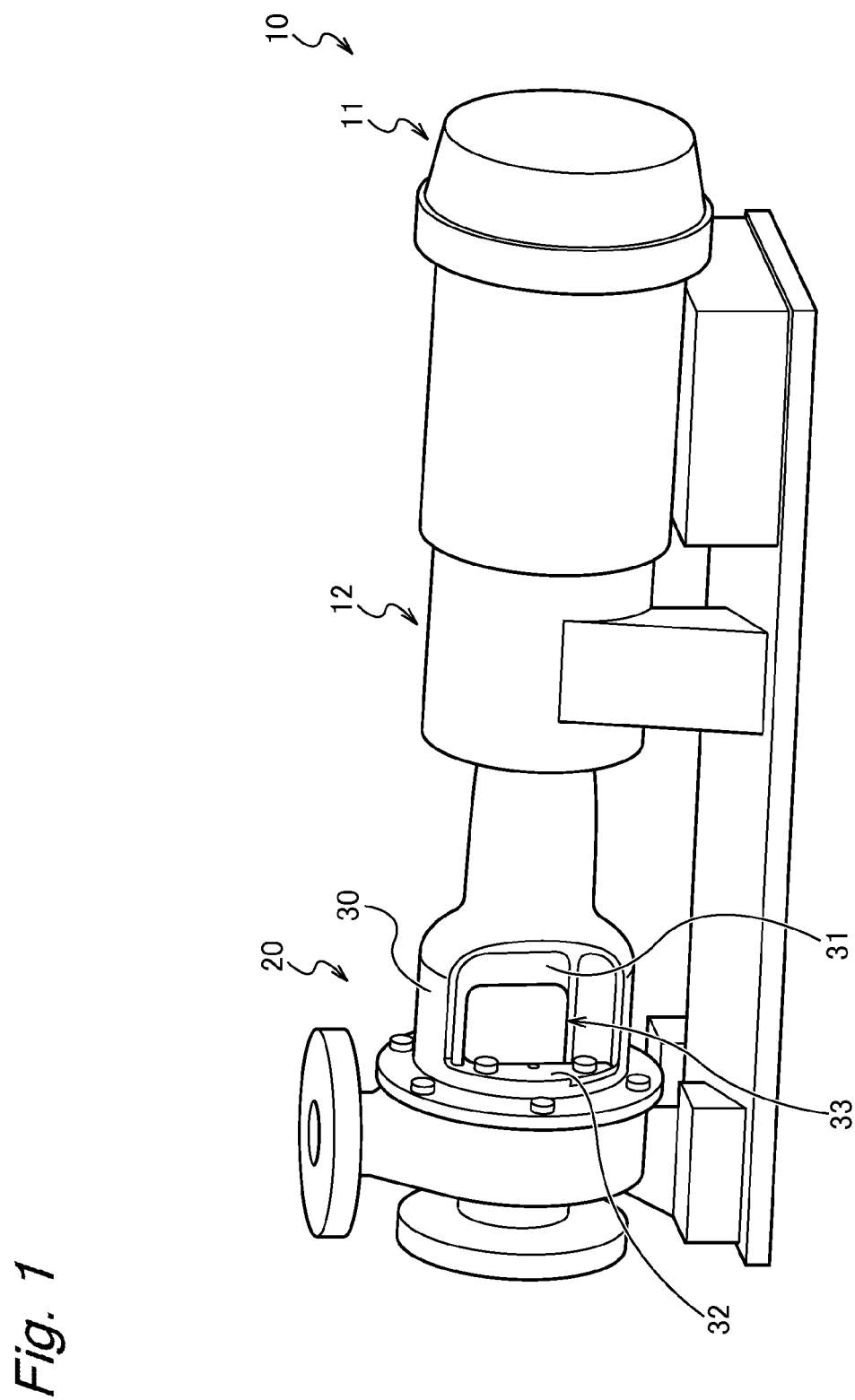
FIG. 1 is an explanatory diagram illustrating an outline configuration of a pump system as one embodiment of the invention.

A rotatable apparatus 20 is shown in FIGS. 1, 2, 3A, 3B, 6A and 6B. The rotatable apparatus 20 includes a casing 30, 130 including a first casing face 31, 131 provided with an opening 33, 133, and a second casing face 32, 132 abutting the first casing face 31, 131, the second casing face 32, 132 intersecting the first casing face 31, 131 at angle θ1; and a protector 50, 150 for closing the opening 33, 133, the protector 50, 150 including a first protector face 51, 151 and a second protector face 52, 152 abutting the first protector face 51, 151, the second protector face 52, 152 intersecting the first protector face 51, 151 at angle θ2. The protector 50, 150 is configured to be fixed to only the second casing face 32, 132. In some embodiments, the angle θ2 is larger than the angle θ1 when the protector 50, 150 is removed from the casing 30, 130. The protector 50, 150 is configured to be attached to the casing 30, 130 in such a manner that the second protector face 52, 152 is fixed to the second casing face 32, 132, and that the first protector face 51, 151 is elastically deformed so that the edge part of the first protector face 51, 151, which is located on the side opposite to the second protector face 52, 152, closely contacts the first casing face 31, 131.

According to the thus-configured rotatable apparatus 20, the protector 50, 150 can be attached to the casing 30, 130 by fixing the protector 50, 150 to only the second casing face 32, 132 of the casing 30, 130. This enormously facilitates the attachment/detachment of the protector 50, 150, as compared to when the protector 50, 150 is fixed to a plurality of faces of the casing 30, 130. Moreover, the protector 50, 150 is attached to the casing 30, 130 such that the edge part of the first protector face closely contacts the first casing face 31, 131 due to the elastic deformation. In other words, the protector 50, 150 can be attached to the casing 30, 130 with the first protector face pressed against the first casing face 31, 131 by a restoring force against the elastic deformation. It is then possible to suppress the vibration and noise of the protector 50, 150 which are created by the operation of the rotatable apparatus 20.

In some embodiments, the protector 50, 150 is configured to be fixed to only the second casing face 32, 132 between the first and second casing faces 31, 131, 32, 132. The protector 50, 150 is made of an elastic material. The angles θ1 and θ2 satisfy an expression, θ1+5≤θ2≤θ1+15, when the protector 50, 150 is removed from the casing 30, 130.

Figure 3A:
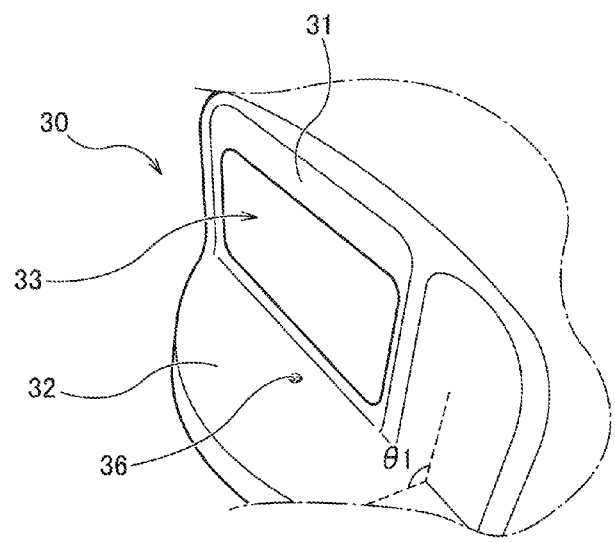
FIG. 3A is an enlarged view illustrating an opening of the bearing casing and the vicinity of the opening before the protector is attached to the opening.
Figure 3B:
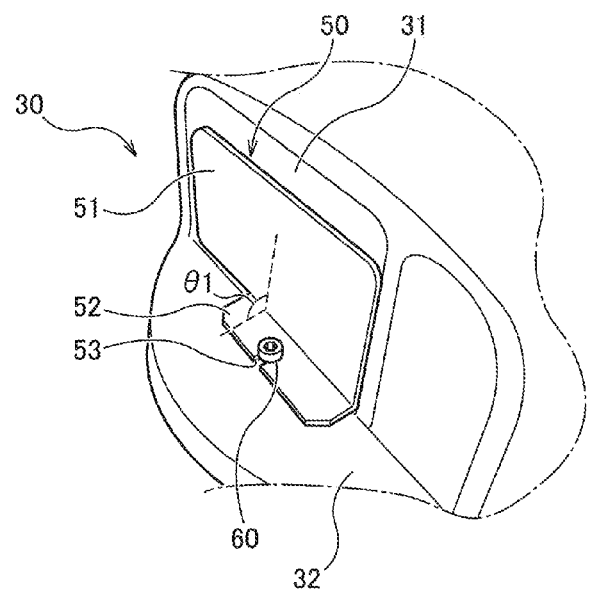
FIG. 3B is an enlarged view illustrating the opening of the bearing casing and the vicinity of the opening after the protector is attached to the opening.
Figure 6A:
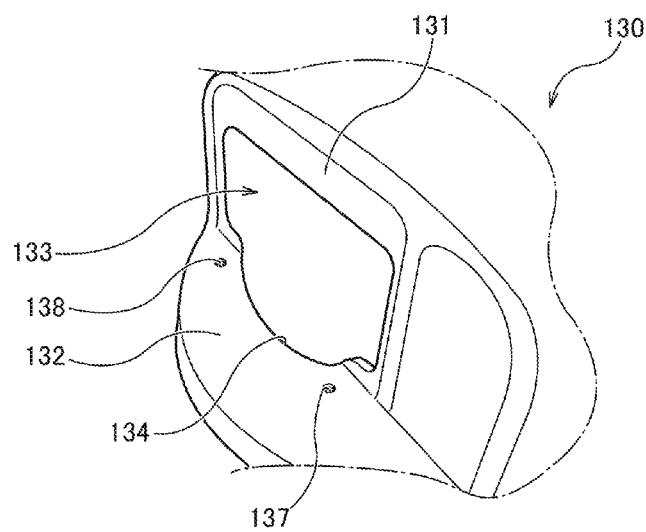
FIG. 6A is an enlarged view illustrating a configuration of an opening of a bearing casing as Modification 1.
Figure 6B:
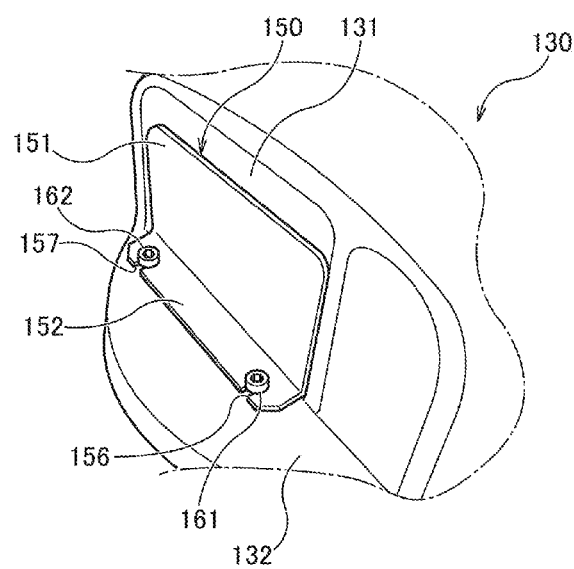
FIG. 6B is an enlarged view illustrating the opening of the bearing casing as Modification 1 and the vicinity of the opening after a protector is attached to the opening.

In some embodiments, the second protector face 52, 152 is provided with a hole 53, 156, 157 for insertion of a male screw 60, 161, 162 by notching an edge part of the second protector face 52, 152, which is located on the side opposite to the first protector face 51, 152, as shown in FIGS. 3B and 6B. Such embodiments makes it possible to position the protector 50, 150 on the casing 30, 130 after the male screw 60, 161, 162 is temporarily tightened to the casing 30, 130, and thus facilitates the positioning. If final tightening is performed on the male screw 60, 161, 162 after the protector 50, 150 is positioned with the second protector face 52, 152 tilted relative to the second casing face 32, 132, the first protector face 51, 152 is elastically deformed by itself, which further facilitates the attachment of the protector 50, 150.

In some embodiments, the protector 50, 150 is fixed to the casing 30 by using only a single male screw 60, as shown in FIG. 3B. Such embodiments makes it possible to fix the protector 50 to casing 30 by one-point fixing, and thus further facilitates the attachment of the protector 50. The above-described embodiments will be described below in further details based on specific examples thereof.

FIG. 1 illustrates an outline configuration of a pump system 10 as one embodiment of the invention. As illustrated in FIG. 1, the pump system 10 includes a motor 11, a coupling 12 and a pump 20. The motor 11 and the pump 20 are jointed together via the coupling 12 (which is housed within a guard in FIG. 1). The pump 20 is provided with a bearing casing 30 that encloses a pump bearing (not illustrated). The bearing casing 30 includes a first casing face 31 extending in a vertical direction and a second casing face 32 abutting (intersecting) the first casing face 31 and extending in a horizontal direction (direction at right angles to the vertical direction). The first casing face 31 is provided with an opening 33. The opening 33 is formed for the purpose of maintenance and inspection of a pump shaft seal part that is housed within the bearing casing 30.

Figure 2:
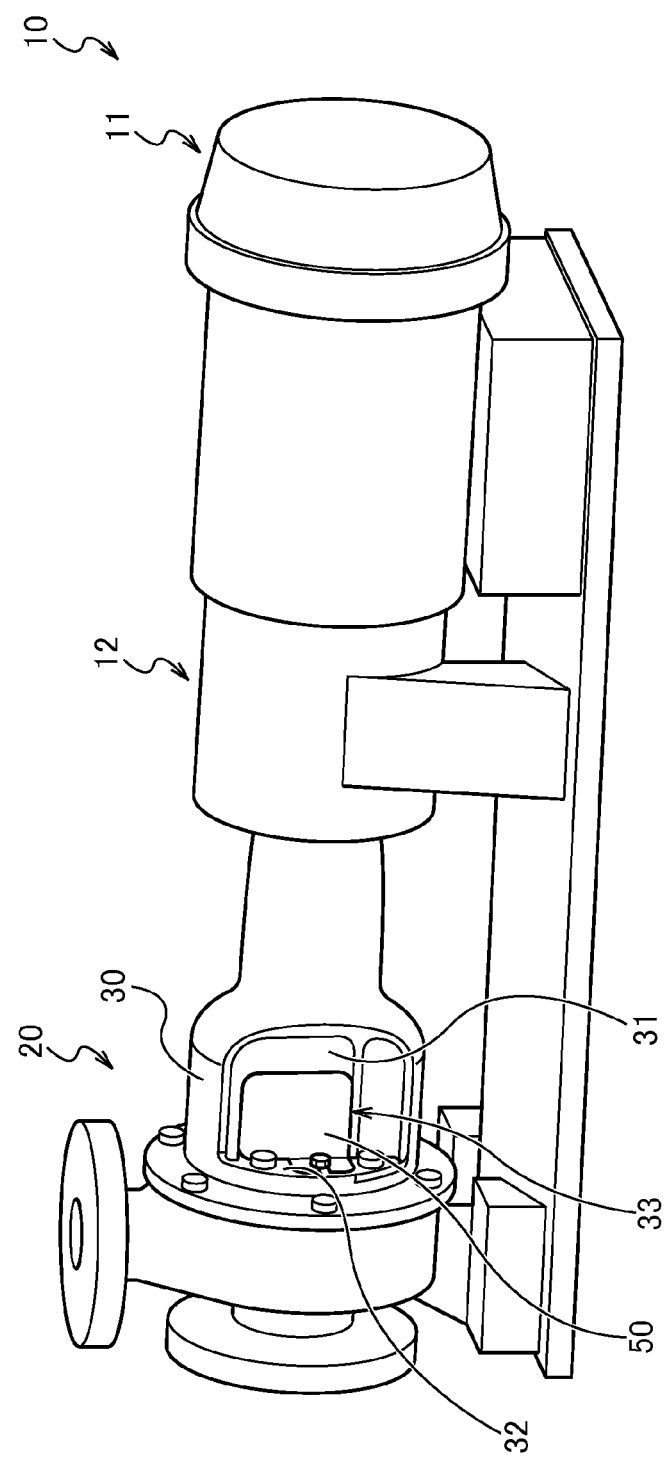
FIG. 2 is an explanatory diagram illustrating a state in which a protector is attached to a bearing casing.

FIG. 2 illustrates the bearing casing 30 illustrated in FIG. 1 with a protector 50 attached thereto. As illustrated in FIG. 2, the opening 33 of the bearing casing 30 is fully closed by the protector 50. The protector 50 is usually attached to the bearing casing 30 as illustrated in FIG. 2. The protector 50 is removed only if the maintenance and inspection of the bearing seal part are needed.

Figure 4:
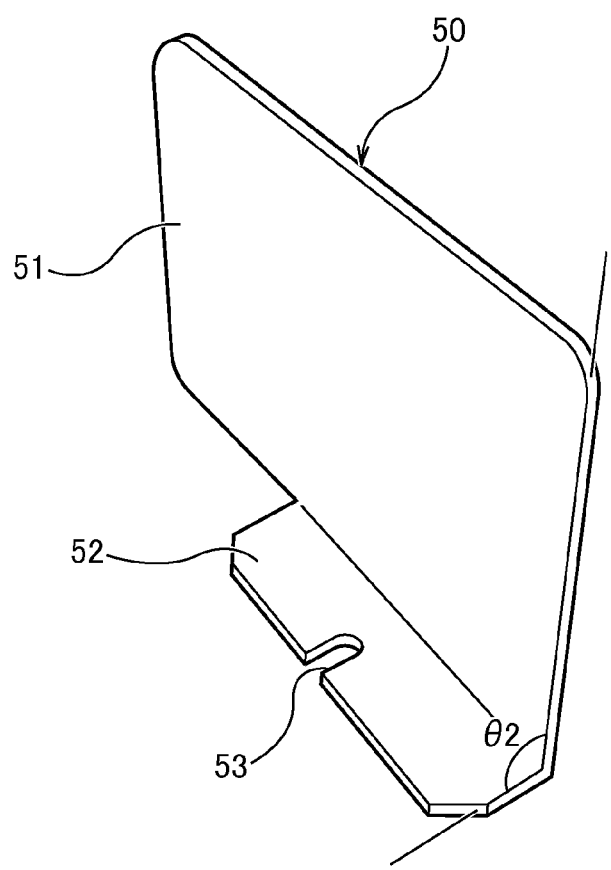
FIG. 4 illustrates the protector removed from the opening of the bearing casing.

FIGS. 3A and 3B are enlarged views illustrating the opening 33 and the vicinity thereof before and after the attachment of the protector 50. FIG. 3A shows the state before the attachment of the protector 50, and FIG. 3B shows the state after the attachment. FIG. 4 shows the protector 50 in a state removed from the bearing casing 30. As illustrated in FIG. 3A, the first and second casing faces 31 and 32 intersect at angle θ1 (90 degrees in the present embodiment). The opening 33 of the first casing face 31 is generally rectangular in shape. A lower end of the opening 33 extends up to a lower end of the first casing face 31, namely, the intersection between the first and second casing faces 31 and 32. The second casing face 32 is provided with a bolt hole 36 close to the first casing face 31. The shape of the opening 33 and the position of the opening 33 on the first casing face 31 may be arbitrary. It is desirable that the position of the bolt hole 36 be as close to the intersection between the first and second casing faces 31 and 32 as possible to create deflection in a first protector face 51 (details will be explained later).

As illustrated in FIG. 4, the protector 50 is formed in a generally L shape. The protector 50 includes a first protector face 51 and a second protector face 52. The first protector face 51 and the second protector face 52 are situated adjacent to each other and intersect at angle θ2. The angle θ2 is slightly larger than the angle θ1. The angles θ1 and θ2 in the present embodiment satisfy the following expression (1). When the angle θ1 is 90 degrees, the angle θ2 is in a range from 95 degrees to 105 degrees inclusive. In the present embodiment, the angle θ2 is 98 degrees.

$$\theta 1+5 \leq \theta 2 \leq \theta 1+15 \tag{1}$$

As illustrated in FIG. 4, the second protector face 52 is provided with a hole 53 for insertion of a male screw (bolt 60 in the present embodiment). The hole 53 is formed by notching an edge part of the second protector face 52, which is located on the side opposite to the first protector face 51, up to the edge part of the second protector face 52 to have a generally U-like shape. It is desirable that the position of an end of the hole 53, which is located on the side of the first protector face 51, be as close to the intersection between the first and second protector faces 51 and 52 as possible to create deflection in the first protector face 51 (details will be explained later). The protector 50 is made of an elastic material. Although made of metal in the present embodiment, the protector 50 may be made of an arbitrary elastic material, such as resin.

The protector 50 can be attached to the bearing casing 30, for example, as described below. Firstly, a bolt 60 is temporarily tightened to the bolt hole 36. The protector 50 is disposed so that the bolt 60 is positioned close to an end of the hole 53, which is located on the side of the first casing face 31. At this time, there is a gap between an end of the second protector face 52, which is located on the side of the first protector face 51, and the second casing face 32 since the angle θ2 at which the first and second protector faces 51 and 52 intersect each other is larger than the angle θ1 at which the first and second casing faces 31 and 32 intersect each other. As final tightening is performed on the bolt 60 in such a state, the gap is gradually decreased. As a result, the edge part of the first protector face 51, which is located on the side opposite to the second protector face 52, contacts the first casing face 31. The first protector face 51 then bends in such a direction that the angle θ2 is decreased, and becomes elastically deformed. The first protector face 51 undergoes the elastic deformation eventually until the angle θ2 reaches substantially the same value as the angle θ1 as illustrated in FIG. 3B. At this time, the edge part of the first protector face 51, which is located on the side opposite to the second protector face 52, closely contacts the first casing face 31 due to a restoring force against the elastic deformation of the first protector face 51.

According to the pump system 10 described above, the protector 50 can be attached to the bearing casing 30 by fixing the protector 50 to only the second casing face 32. The attachment/detachment of the protector 50 is therefore easily performed, as compared to when the protector 50 is fixed to both the first and second casing faces 31 and 32 of the bearing casing 30. The protector 50 furthermore can be attached to the bearing casing 30 in a state where the first protector face 51 is pressed against the first casing face 31 due to a restoring force against the elastic deformation thereof. It is thus possible to suppress the vibration and noise of the protector 50 which are created by the operation of the pump system 10.

According to the pump system 10, since the hole 53 has the shape of a notch, the protector 50 can be positioned on the second casing face 32 after the bolt 60 is temporarily tightened in the bolt hole 36. This facilitates the positioning of the protector 50. Moreover, if final tightening is performed on the bolt 60 after the protector 50 is positioned in a state where the second protector face 52 is tilted relative to the second casing face 32, the first protector face 51 is elastically deformed by itself, which further facilitates the attachment of the protector 50.

According to the pump system 10, the protector 50 can be fixed to the bearing casing 30 by using only the single bolt 60, that is, by one-point fixing, so that the attachment of the protector 50 becomes still easier.

FIG. 5 is a table showing the results of an evaluation test on the angle θ2 at which the first and second protector faces 51 and 52 intersect each other. In the subject test, the protector 50 with a thickness of 1 mm, made of SUS304 material, and the bearing casing 30 in which the angle θ1 is 90 degrees, at which the first and second casing faces 31 and 32 intersect each other, were used to evaluate a contact condition and an elasticity condition with respect to each of a plurality of angles θ2. The contact and elasticity conditions were as follows:

Contact condition: In a state where the protector 50 is screwed to the bearing casing 30, the edge part of the first protector face 51, which is located on the side opposite to the second protector face 52, closely contacts the first casing face 31.

Elasticity condition: In a state where the protector 50 is screwed to the bearing casing 30, the first protector face 51 is elastically deformed (undergoes not plastic but elastic deformation).

As illustrated in the table, both the contact and elasticity conditions were satisfied when the angle $\theta 2$ was in a range from 95 degrees to 105 degrees, inclusive, that is, the angle $\theta 2$ was larger than the angle $\theta 1$ by an arbitrary value in a range from 5 degrees to 15 degrees, inclusive. This result applies not only to when the angle $\theta 1$ is 90 degrees but also generally to when the angle $\theta 1$ is an arbitrary value.

B. Modifications

B-1. Modification 1

The opening of the bearing casing 30 may be formed across two faces. In such a case, the opening may be closed by two faces of the protector. FIGS. 6A and 6B show an embodiment in which two continuous openings are closed by the protector. As illustrated in 6A and 6B, a bearing casing 130 includes a first casing face 131 and a second casing face 132. The first casing face 131 is provided with an opening 133, and the second casing face 132 with an opening 134. Bolt holes 137 and 138 are formed on both sides of the opening 134 of the second casing face 132 adjacently to the first casing face 131. The openings 133 and 134 are continuously formed. A protector 150 for closing the openings 133 and 134 includes a first protector face 151 and a second protector face 152. Two holes 156 and 157 are formed in the second protector face 152 so as to be located on both sides of the opening 134. The protector 150 is fixed to the bearing casing 130 by using bolts 161 and 162 in the above-mentioned manner. As a result, the opening 133 is closed by the first protector face 151, and the opening 134 by the second protector face 152.

B-2. Modification 2

The protectors 50 and 150 can be utilized in various kinds of rotatable apparatuses, which include, for example, liquid agitators, centrifugal blowers/ventilators, light-duty conveyors, power generators, worm gear reducers, conveyors, hoists, elevators, line shafts, hole mills, reciprocating compressors, hammer mills, crashers, marine propellers, etc.

The embodiments of the invention have been described on the basis of several exemplary embodiments. The above-mentioned embodiments of the invention are not intended to limit the invention but to facilitate the understanding of the invention. Needless to say, the invention may be modified or improved without deviating from the spirit thereof, and includes equivalents thereto. The elements mentioned in the claims and the description may be arbitrarily combined or omitted as long as at least a part of the above-mentioned problem is solved or at least a part of the advantageous effects is produced.

The present application claims the priority of the Japanese Patent Application No. 2014-031932 filed on Feb. 21, 2014 in Japan. This disclosure is incorporated herein by reference in its entirety.

What is claimed is:

1. A rotatable apparatus comprising:
   a casing including a first casing face provided with an opening and a second casing face abutting the first casing face, the second casing face intersecting the first casing face at angle $\theta 1$; and
   a protector for closing the opening, the protector including a first protector face and a second protector face abutting the first protector face, the second protector face intersecting the first protector face at angle $\theta 2$, wherein
   the protector is configured to be fixed to only the second casing face,
   the angle $\theta 2$ is larger than the angle $\theta 1$ when the protector is removed from the casing, and
   the protector is configured to be attached to the casing in such a manner that the second protector face is fixed to the second casing face, and that the first protector face is elastically deformed so that an edge part of the first protector face, which is located on the side opposite to the second protector face, closely contacts the first casing face.

2. The rotatable apparatus according to claim 1, wherein the protector is fixed to the casing by using only a single male screw.

3. A rotatable apparatus comprising:
   a casing including a first casing face provided with an opening and a second casing face abutting the first casing face, the second casing face intersecting the first casing face at angle $\theta 1$; and
   a protector for closing the opening, the protector including a first protector face and a second protector face abutting the first protector face, the second protector face intersecting the first protector face at angle $\theta 2$, wherein
   the protector is configured to be fixed to only the second casing face between the first and second casing faces,
   the protector is made of an elastic material, and
   the angles $\theta 1$ and $\theta 2$ satisfy an expression, $\theta 1+5 \leq \theta 2 \leq \theta 1+15$, when the protector is removed from the casing.

4. The rotatable apparatus according to claim 3, wherein the second protector face is provided with a hole for insertion of a male screw by notching an edge part of the second protector face, which is located on the side opposite to the first protector face.

5. The rotatable apparatus according to claim 3, wherein the protector is fixed to the casing by using only a single male screw.

6. A rotatable apparatus comprising:
   a casing including a first casing face provided with an opening and a second casing face abutting the first casing face, the second casing face intersecting the first casing face at angle $\theta 1$; and
   a protector for closing the opening, the protector including a first protector face and a second protector face abutting the first protector face, the second protector face intersecting the first protector face at angle $\theta 2$, wherein
   the protector is configured to be fixed to only the second casing face,
   the angle $\theta 2$ is larger than the angle $\theta 1$ when the protector is removed from the casing,
   the protector is configured to be attached to the casing in such a manner that the second protector face is fixed to the second casing face, and that the first protector face is elastically deformed so that an edge part of the first protector face, which is located on the side opposite to the second protector face, closely contacts the first casing face, and
   the second protector face is provided with a hole for insertion of a male screw by notching an edge part of the second protector face, which is located on the side opposite to the first protector face.

* * * * *